US012612568B2

(12) United States Patent
Bhattacharyya et al.

(10) Patent No.: US 12,612,568 B2
(45) Date of Patent: Apr. 28, 2026

(54) LINED VESSEL, COMPOSITE, AND PROCESS

(71) Applicant: UOP LLC, Des Plaines, IL (US)

(72) Inventors: Souryadeep Bhattacharyya, Hoffman Estates, IL (US); John Qianjun Chen, Morton Grove, IL (US); Chirag Shah, Des Plaines, IL (US); Haibo Yu, Cambridge, MA (US); Kristoffer Popp, Mount Prospect, IL (US); Michael A. Stine, Lake Zurich, IL (US); Steven Bradley, Arlington Heights, IL (US)

(73) Assignee: UOP LLC, Rosemont, IL (US)

( * ) Notice: Subject to any disclaimer, the term of this patent is extended or adjusted under 35 U.S.C. 154(b) by 216 days.

(21) Appl. No.: 18/527,765

(22) Filed: Dec. 20, 2023

(65) Prior Publication Data

US 2025/0207046 A1    Jun. 26, 2025

(51) Int. Cl.
*C10G 75/04* (2006.01)
*B01J 19/02* (2006.01)
*C04B 35/76* (2006.01)

(52) U.S. Cl.
CPC .............. *C10G 75/04* (2013.01); *B01J 19/02* (2013.01); *C04B 35/76* (2013.01); *B01J 2219/0218* (2013.01); *C04B 2235/5216* (2013.01); *C04B 2235/77* (2013.01); *C04B 2235/9669* (2013.01)

(58) Field of Classification Search
CPC .......... C10G 75/04; C10G 9/203; B01J 19/02; B01J 2219/0218; B01J 8/28; B01J 8/388; C04B 35/76; C04B 2235/5216; C04B 2235/77; C04B 2235/9669; C04B 35/101; C04B 35/18; C04B 35/447; C04B 2235/522; C04B 35/80; C22C 38/06; C22C 38/18
USPC .......................................... 535/636
See application file for complete search history.

(56) References Cited

U.S. PATENT DOCUMENTS

| | | | | | |
|---|---|---|---|---|---|
| 5,026,273 | A | * | 6/1991 | Cornelison | ............. F23C 13/00 502/527.22 |
| 2021/0162359 | A1 | * | 6/2021 | Kolios | ................... C04B 35/80 |

* cited by examiner

*Primary Examiner* — Vishal V Vasisth
*Assistant Examiner* — Francis C Campanell
(74) *Attorney, Agent, or Firm* — Paschall & Associate, LLC; James C. Paschall

(57) ABSTRACT

A hydrocarbon conversion process is disclosed. The process introduces a feed stream comprising hydrocarbons into a vessel having a refractory lining. The refractory lining comprises a refractory material and reinforcement metallic fibers. The reinforcement metallic fibers comprise about 0.5 wt % to about 8 wt % aluminum, 10 wt % to about 35 wt % chromium, and no less than about 50 wt % iron. The hydrocarbons are converted in the vessel at conversion conditions with or without a catalyst to yield a product stream.

17 Claims, 4 Drawing Sheets

LINED VESSEL, COMPOSITE, AND PROCESS

FIELD

The field is related to a process and apparatus for converting hydrocarbons. Particularly, the field relates to a process for converting hydrocarbons in a vessel having a refractory lining.

BACKGROUND

Hydrocarbon conversion processes typically require reactor systems, and associated conduits and piping, adapted for hydrocracking, reforming, fluid catalytic cracking, and other similar processes. At the process conditions and temperatures that are required for hydrocarbon conversion, solid carbonaceous materials, referred to as coke, typically form on the metal alloy surfaces of the reactor components and associated equipment due to metal catalyzed reactions at the metal alloy surfaces. The formation of metal catalyzed coke deposits is influenced by factors such as the composition of the hydrocarbon feed, the conversion process, the specific reaction conditions, and the metallurgy and configuration of the reactor and associated equipment.

For many hydrocarbon processes in refining and petrochemical services, as typically employed, metal catalyzed coke deposits commonly occur at appreciable rates from about 350° C. (662° F.) to about 850° C. (1562° F.). The formation of metal catalyzed coke deposits for a particular process is dependent upon the process conditions, the composition of the hydrocarbons involved, the compositions of the metal surfaces in contact with the hydrocarbon stream, the time that the metal and hydrocarbon stream are in contact, and other similar considerations. The temperature at which a process will produce metal catalyzed coke can be referred to as the metal catalyzed coke onset temperature. If a process is operated at temperatures greater than the metal catalyzed coke onset temperature, the buildup of metal catalyzed coke deposits can cause a number of significant problems within a reactor and associated equipment, and may result in severe heat transfer reductions, undesirable pressure drops within the process, loss of process efficiencies, and premature shut down of the conversion process. Accordingly, metal catalyzed coke deposits can become sufficiently severe to require the premature shut down of the hydrocarbon conversion process to regenerate the catalyst, and to decoke and replace reactor and other surfaces subject to the coke deposits, as well as those damaged components by coking and associated reactions.

Metals that catalyze the coke formation may reside on or in the catalyst, may be present on the process equipment, or can exist in the feed stream. Typical catalyzing metals include: manganese, iron, cobalt, nickel, and chromium, among others. Such metals and their alloys are frequently used in hydrocarbon conversion reactors and related equipment and therefore often provide reaction sites for metal catalyzed coke formation. For instance, where a reactor or related components are austenitic stainless steel 300-series, the iron, chromium, and/or nickel metal alloys of the stainless steel provide the sites and surfaces for precipitates of metal catalyzed coke to form at the operating conditions and temperatures used for hydrocarbon conversion processes.

Use of process temperatures below metal catalyzed coke onset temperature, may help reduce or eliminate metal catalyzed coke formation, but the use of such reduced temperatures often is not desirable. Many hydrocarbon conversion processes require or benefit from temperatures approaching or exceeding the coke onset temperature to obtain efficient conversion rates and desired hydrocarbon conversion products and product mixes. Often methods for reducing coke formation, such as using antifoulant additives, free radical scavengers, process equipment modifications to introduce turbulence and additional mixing, applying coatings to the inside of the process equipment, use of higher-grade expensive metallurgy, or combining the metal alloys of the process equipment with an anti-coking agent have met with limited success.

In some instances, sulfur or sulfur compounds are used to inhibit metal catalyzed coke (MCC) formation at the metal alloy surfaces of reactors and associated equipment. The introduction of sulfur can raise the coke on-set temperature and thus prevent metal catalyzed coke at the operating temperature by increasing the coke on-set temperature to above the operating temperature, however, sulfidation attack of the metal then can become a concern. Such sulfur compositions used as metal catalyzed coking inhibitors typically are introduced by addition to the initial hydrocarbon stream and may be added during the conversion process. Where the sulfur inhibitors are provided by addition, they typically are supplied by the addition of dimethyl sulfide (C2H6S) or dimethyldisulfide (DMDS) (C2H6S2) to the process stream, which then generate hydrogen sulfide (H2S) in the process stream. In such approaches, the typical concentration levels of H2S typically are from about 0.25 wt. ppm to about 200 wt. ppm. At temperatures above about 350° C. (662° F.), typical reactor materials, such as type 347 stainless steel, are corrosively reactive with H2S in the hydrocarbon stream as a result of sulfidation reactions between the H2S and the metals of the metal alloy surfaces. Such corrosion of the metal alloy surfaces can substantially reduce the useful life of the reactor components and related equipment, cause fouling, and interfere with the operation of the hydrocarbon conversion process.

MCC deposits of coke heterogeneously catalyzed on the surface of reactors and equipment due to the presence of catalyzing metals present in the process metallurgy are common in hydrocarbon conversion processes such as dehydrogenation especially at temperatures over 350° C. Rises in temperature lead to exponential increases in the coking rates. Olefin production processes such as dehydrogenation process with high amounts of coke precursors including olefins, diolefins and acetylenes have high risks of coke formation, with the presence of coke precursors lowering the coke onset temperatures. The problems with the buildup of MCC deposits are well known. Reducing process severity, for example temperature may reduce or eliminate MCC, but is undesirable from the viewpoint of process economics, and the need for efficient conversion rates and yields. This is especially true for olefin production processes that often need to approach temperatures of 500° C. or 600° C. or more for advantageous economics.

Refractory compositions are recommended for use in various industries such as steel making, iron ore reduction, aluminum production, glass making, hydrocarbon processing compatible for the specific process. One example is the use of basic magnesia refractories in steel making. In hydrocarbon processing, primary focus areas of refractories are high abrasion resistance often due to high flow rates of abrasive catalysts inside reactors and good insulating properties to conserve heat and provide a thermal gradient between the process-facing hot face of the refractory and the cold wall pressure boundary shell.

Hydrocarbon conversion processes often use iron or nickel and iron-based alloys as reactor materials which can heterogeneously catalyze coke formation such as metal catalyzed coke leading to plugging, metal dusting and corrosion, reducing equipment lifetimes at temperatures as low as 400° C. and above. Several measures such as applying coatings to the reactor surface, or using corrosion resistant grades of reactor materials are often proposed along with process changes such as injecting antifoulants or passivators for example dimethyl disulfide or lowering reaction severity like temperatures to protect the reactor metallurgy. Less attention has been paid to the refractory compositions used in hydrocarbon processing.

In fluidized bed hydrocarbon processes, refractory layers are typically applied to protect the metal walls from abrasion and provide good insulating properties. However, presence of impurities in the refractory such as iron can catalyze MCC and break apart the refractory.

In some refractories, reinforcing fibers are used to provide resistance to crack propagation and increase the hot modulus of rupture, especially under thermal cycling in shaped refractories. Typically, reinforcing fibers from carbon steels to stainless steel in the 300 series are used at high temperature and for increased ductility. However, under severe hydrocarbon processing conditions, for example under reducing paraffin dehydrogenation conditions at a temperature of over 600° C., the usually recommended stainless steel 300 series fibers are susceptible to coking and potentially pulverizing the porous refractory in pieces, exposing the underlying internals to further accelerated coking. In other cases, if coking is too extreme, the refractory can peel away from the wall and fall into the reactor damaging the internals. This is referred to as 'jacking'. In such cases, the compromised refractory can lead to exposure of the underlying shell or internal base plate, resulting in some combination of erosion, accelerated coking, and potential shell hot spots.

Ceramic or non-metallic reinforcing fibers have limitations such as general brittleness, difficulty of fabrication due to fragmentation and surface flawing during mixing with an abrasive material such as a refractory material matrix, which restrain their application in refractory.

Dehydrogenation processes are of particular interest to the petroleum industry because light hydrocarbons such as butane are low-value by-products from refining operations. Butane can be converted to butylenes through dehydrogenation, which can then be used to produce MTBE. Additionally, propane can be dehydrogenated to make propylene which is used to make plastics.

Since dehydrogenation of hydrocarbons is an endothermic reaction and conversion levels are limited by chemical equilibrium, it is desirable to operate at high temperatures and low pressures. High temperatures and low pressures shift the equilibria favorably toward dehydrogenated products. However, conventional dehydrogenation catalysts suffer rapid deactivation by coking under these severe conditions. In particular, it has been found that slow accumulation of carbon deposits reduces the dehydrogenation activity of conventional dehydrogenation catalysts. Thus, conventional carbon burn-off cycles are typically used to regenerate the catalyst system after sufficient accumulation of carbon on the catalyst. In addition, sulfur compounds and hydrogen are usually introduced to the reactor feed in order to prevent carbon build-up in the reactor and on the catalyst.

Therefore, there is a need for a refractory suitable for processes operating under high severity conditions to mitigate the MCC formation and carburization.

4

SUMMARY

The present disclosure provides a process and an apparatus for processing hydrocarbons. The process comprises introducing a feed stream into a vessel having a refractory lining comprising a refractory material and reinforcement metallic fibers comprising about 0.5 wt % to about 8 wt % aluminum, 10 wt % to about 35 wt % chromium, and no less than about 50 wt % iron. The feed stream comprising hydrocarbons is processed in the vessel. The apparatus for processing hydrocarbons comprises a vessel having a refractory lining comprising a refractory material and reinforcement metallic fibers comprising about 0.5 wt % to about 8 wt % aluminum, 10 wt % to about 35 wt % chromium, and no less than about 50 wt % iron. Further, a composite of a refractory material and reinforcement metallic fibers is disclosed. The reinforcement metallic fibers of the composite comprise about 0.5 wt % to about 8 wt % aluminum, about 10 wt % to about 35 wt % chromium, and no less than about 50 wt % iron.

DEFINITIONS

Figure 1:
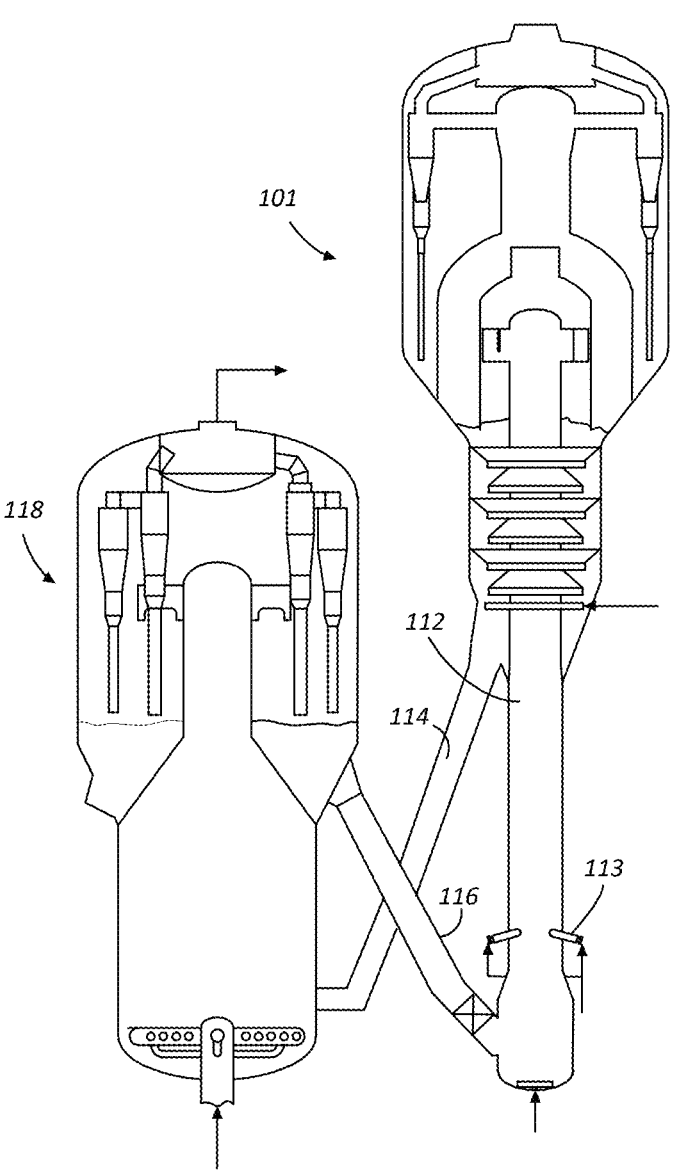
FIG. 1 is an exemplary fluid catalytic cracking (FCC) unit in accordance with an exemplary embodiment of the present disclosure.

As used herein the terms "vessel", "reactor", "process equipment," "process units," or "reactor components" shall include any and all process equipment and process units that are utilized in hydrocarbon conversion processes including any upstream and/or downstream equipment from the particular unit and/or ancillaries, such as furnace tubes, associated piping, heat exchangers, heater tubes, and the like.

DETAILED DESCRIPTION

Usually, the following steps may take place in the formation of metal-catalyzed coking (MCC) in a reactor: chemisorption of species on a metal surface to form metal-hydrocarbon complex on metal crystallites; decomposition of the metal-hydrocarbon complex; diffusion of carbon through metal particles and depositing at grain boundaries; stress caused by deposited carbon eventually removing the metal crystallite, growth of the carbon filament from the surface with the metal crystallite at the tip. Here, carbon diffusion through metal crystallite may be considered the rate controlling step.

The present disclosure provides a refractory lining for vessels comprising a refractory material and reinforcement metallic fibers that can be used for high temperature and high severity hydrocarbon conversion applications, which is becoming more relevant in the modern petrochemical industry. Any hydrocarbon process that requires refractory lining to protect the underlying metallurgy of a vessel under any process condition such as oxidizing or reducing or a combination of both and any process configuration such as fixed bed, moving bed and fluidized bed with any part of the reactor operating at or above 500° C. can benefit from the refractory lining of the present disclosure to mitigate coking, particularly MCC.

It has been reported that formation of MCC filaments promote further non-catalytic heterogeneous coke deposition and coking reactions. Embrittlement of the reactor metallurgy due to carburization where carbon diffuses into crystal grain boundaries from the process stream forms metal carbides. Formation of metal carbides leads to metal-dusting, a release of catalytically active particles and metal droplets that can catalyze further coke formation in other areas to which they are deposited throughout the process.

In an aspect of the present disclosure, the refractory lining may be used for various processes including but not limited to steam reforming of hydrocarbons to produce hydrogen and carbon monoxide, hydrocracking, hydrotreating, isomerization, reforming, fluid catalytic cracking, catalytic naphtha cracking, steam cracking, dehydrogenation including the employment of ion conducting membranes, fluidized catalytic dehydrogenation, catalytic dehydroalkylation, thermal dehydroalkylation, toluene methylation, methanol to gasoline (MTG), methanol to olefins (MTO), partial oxidative reforming, autothermal reforming of methane and higher hydrocarbons. The lining is particularly useful for reactor vessels that produce olefins.

The refractory lining of the present disclosure comprises reinforcement metallic fibers dispersed throughout the refractory matrix. The reinforcement metallic fibers in the refractory lining when used in hydrocarbon processing applications provide increased carburization resistance areas. In the refractory lining of the present disclosure, the reinforcement metallic fibers are not only carburization resistant but also provide the general protections of fiber reinforcement afforded by stainless steel to refractories, such as minimizing crack propagation and increased ductility and thermal cycling resistance. Increased refractory durability under severe conditions enables hydrocarbon conversion processes to operate at the given higher severity to provide higher yields or conversions.

The present disclosure discloses introducing a feed stream comprising hydrocarbons into a vessel having a refractory lining comprising a refractory material and reinforcement metallic fibers which provides carburization and coking resistance in hydrocarbon conversion processes that require insulation and/or abrasion resistance to the vessel wall. In cases in which the vessel wall has process fluid on both sides, for example in a fluidized catalytic riser, the refractory lining may be applied on both sides of the vessel or pipe wall. A vessel includes a reactor and its surfaces, reactor components, tubes, heat exchangers, heater tubes, associated piping and the like.

Impurities in the refractory material such as iron can catalyze MCC. While there is no specific composition of the refractory material that the present disclosure is limited to, the refractory material must have low intrinsic coking potential under the process conditions. Some examples of manufacturers of refractories include Calderys, Harbison-Walker Refractories, Morgan Thermal Ceramics, AGC Plibrico Co., Ltd., Resco Products, Stellar Materials, RHI Refractories, and Vesuvius Refractories International, Inc. In an exemplary embodiment, the refractory material is Thermbond 2125 refractory from Stellar Materials with high amounts of alumina and silica, phosphates and low iron content. The composition of the Thermbond 2125 may be as below in Table 1:

TABLE 1

| Thermbond Refractory | Chemical Composition, wt % | | | | | Bulk Density, lbs/ft3 (As-Placed) | Compressive Strength, psi (816° C.) |
| | $Al_2O_3$ | $SiO_2$ | $Fe_2O_3$ | $P_2O_5$ | Other | | |
| Formula 2125 (medium weight insulating) | 47 | 37 | 0.8 | 9 | 6.2 | 137 | 6800 | against MCC and reduces coke formation. The present disclosure provides proper grades of reinforcing fibers to be used in refractories for severe hydrocarbon processing applications with the aim of increased carburization resistance and lower coke formation by MCC. Particularly, the present disclosure addresses the problem of MCC for refractories comprising fibers used in refractories under gaseous hydrocarbon conversion processes. The disclosed refractory lining with the reinforcement metallic fibers lowers coke formation under hydrocarbon conversion processes and improves the durability of the refractory lining on the vessel. The high carburization resistance refractory lining of the present disclosure functions longer under the process conditions without breaking apart due to coking on the embedded fibers.

The reinforcing fibers embedded within the porous refractory are exposed to fluid coke precursors in the process that can diffuse in, and presence of cracks or crevices in the refractory can lead to formation of dead-zones in the vessel, for example the reactor, that can exponentially increase coke formation due to significantly low or zero space velocity The refractory lining of the present disclosure can be applied to any type of reactor including fixed, moving bed and fluidized bed reactors that may be operated at temperatures on or above 400° C. The refractory lining of the present disclosure can be used for hydrocarbon conversion processes operating at oxidizing, reducing or combined environments. Also, the refractory lining of the present disclosure can be supported by an anchorage support system for example V-anchors, S-bars etc., which may be attached to the internal surface of the vessel wall for supporting the refractory lining on the wall. The wall of the vessel is typically metal. The refractory lining of the present disclosure provides insulation and/or abrasion resistance to the vessel or the equipment on which it is applied. In an aspect, the refractory lining of the present disclosure provides insulation to the vessel or the equipment on which it is applied.

In another embodiment of the present disclosure, a composite comprising a refractory material, and reinforcement metallic fibers is disclosed. In an embodiment, the refractory material comprises no more than about 3.5 wt % iron oxide and at least about 33 wt % aluminum oxide. The reinforcement metallic fibers may comprise about 0.5 to about 8 wt % aluminum, 10 to about 35 wt % chromium and no less than about 50 wt % iron. In an aspect, the reinforcement metallic fibers comprise no more than about 17 wt % chromium. In another aspect, the reinforcement metallic fibers comprise at least 2 wt % aluminum and no more than 18 wt % chromium.

The composite may comprise any suitable refractory material which provides insulation and/or abrasion resistance. In an embodiment, the refractory material may be characterized by a refractory density of about 1120 to about 2320 kg/m$^3$. In another embodiment, the refractory material may be characterized by a refractory cold crushing strength of at least 42 kg/m$^2$.

In an exemplary embodiment, the composite may comprise from about 1 wt % to about 10 wt % reinforcement metallic fibers. In another exemplary embodiment, the reinforcement metallic fibers are oxidized metallic fibers.

In accordance with an embodiment of the present disclosure, a hydrocarbon conversion process is disclosed. The process comprises introducing a feed stream comprising hydrocarbons into a vessel having a refractory lining. In an exemplary embodiment, the refractory lining comprises a refractory material and reinforcement metallic fibers comprising about 0.5 wt % to about 8 wt % aluminum, 10 wt % to about 35 wt % chromium, and no less than about 50 wt % iron. In another exemplary embodiment, the reinforcement metallic fibers may comprise at least 2 wt % aluminum and no more than about 18 wt % chromium. The hydrocarbons may be processed in the vessel at conditions present therein. Moreover, the hydrocarbons may be converted in the vessel at conversion conditions with or without a catalyst to yield a product stream. In an aspect of the present disclosure, the product stream may comprise olefins. In another aspect of the present disclosure, the process is a fluidized catalytic process including a paraffin dehydrogenation (PDH) process, a toluene methylation process, a catalytic naphtha cracking process, and a fluidized catalytic cracking (FCC) process.

Aluminum is an element used for improving the carburization resistance of stainless steel as it forms a stable alumina layer on the surface of the metallic fibers that improves the resistance to coke formation. In order to ensure acceptable carburization resistance, about 0.5 wt % to about 8 wt % aluminum may be used while higher than about 8 wt % aluminum may reduce the toughness of the steel. In an exemplary embodiment of the present disclosure, the reinforcement metallic fibers may comprise no less than about 13 wt % chromium.

In another exemplary embodiment of the present disclosure the inner refractory lining comprises about 1 wt % to about 10 wt % reinforcement metallic fibers.

The reinforcement metallic fibers may have any suitable shape and/or size as per application. Fibers are preferably helical, wavy, and/or corrugated to increase surface area and improve bonding with the refractory. Optionally, the reinforcement metallic fibers may be oxidized in air under elevated temperatures before incorporation in the refractory material for added coking mitigation. In an exemplary embodiment, the reinforcement metallic fibers may be oxidized in dry air at a temperature of about 600° C. to about 800° C. to provide oxidized metallic fibers. In an aspect, the inner refractory lining may comprise oxidized metallic fibers.

In another aspect of the present disclosure, the reinforcement metallic fibers may be oxidized in situ. In accordance with the present disclosure, the reinforcement metallic fibers may undergo oxidation in situ during the dry out process of the refractory in the process unit. The dry out process is normally a staged process heating from ambient to process temperature usually under air flow at the process start up.

The refractory lining may also comprise minor alloying components in an amount of about 1 wt %. In an embodiment, the reinforcement metallic fibers may comprise about less than about 1 wt % each of one or more of carbon, silicon, manganese, sulfur, and phosphorus.

Further, the refractory lining may comprise some optional components. In an embodiment, the reinforcement metallic fibers may comprise molybdenum of less than about 20 wt %, one or more of cobalt, yttrium, niobium, and copper of less than about 5 wt % in total, titanium of less than about 1 wt %, and lanthanides of less than about 1 wt %.

In accordance with an aspect of the present disclosure, the hydrocarbon conversion is a fluid catalytic cracking (FCC) process. The FCC process is well known for conversion of relatively high-boiling hydrocarbons to lighter hydrocarbons. In many catalytic cracking reactors, often referred to as riser reactors, risers or pipe reactors, a long chain hydrocarbon feed cracks over a catalyst to produce shorter chain products. This can be referred to as cracking the feed. The feed and fluidized catalyst are introduced at a lower entrance to a vertical riser and travel vertically upwards within the riser reacting at very high temperatures until they reach an upper exit.

FIG. 1 shows an exemplary FCC unit 101 comprising a reactor riser 112 and a catalyst regenerator 118. The FCC unit 101 has been illustrated schematically for purposes of clarity and brevity, with elements not important to consideration of the present disclosure not included. In the reactor riser 112, a hydrocarbon feedstock passed through a distributor 113 or more distributors near the base of the reactor riser 112 is contacted with a stream of fluid catalyst. The hydrocarbon feedstock vaporizes and converts or cracks to a cracked product. Conditions in the reactor riser 112 may include a cracking reaction temperature of about 400° C. to about 700° C., preferably about 565° C. to about 600° C. at the reactor outlet. The cracking occurs at an absolute pressure between about 100 kPa (14 psia) to about 506 kPa (74 psia), preferably between about 138 kPa (20 psia) to about 310 kPa (45 psia).

A spent catalyst is taken and passed to the catalyst regenerator 118 through a spent catalyst pipe 114. In the catalyst regenerator 118, coke is combusted from the spent catalyst in a combustion chamber to provide a regenerated catalyst. The regenerated catalyst is passed to the reactor riser 112 through a regenerated catalyst pipe 116 where it is mixed with the incoming hydrocarbon feedstock.

Reaction efficiency in the riser depends, among other factors, on good and uniform mixing between the feedstock and fluidized catalyst. It is desirable that the feed be uniformly dispersed in a stream of fluidized catalyst that is moving up the riser. In many risers, however, even if near uniform dispersion is achieved at the riser entrance, non-uniform mixing can occur as the materials travel upwards due (at least in part) to non-uniform cross sectional gas velocities that result from temperature differentials and other factors. In an embodiment of the present disclosure, a continuous refractory lining may be attached to the inner surface and/or the outer surface of the wall of the riser to minimize heat loss and resist erosion and corrosion.

Figure 2:
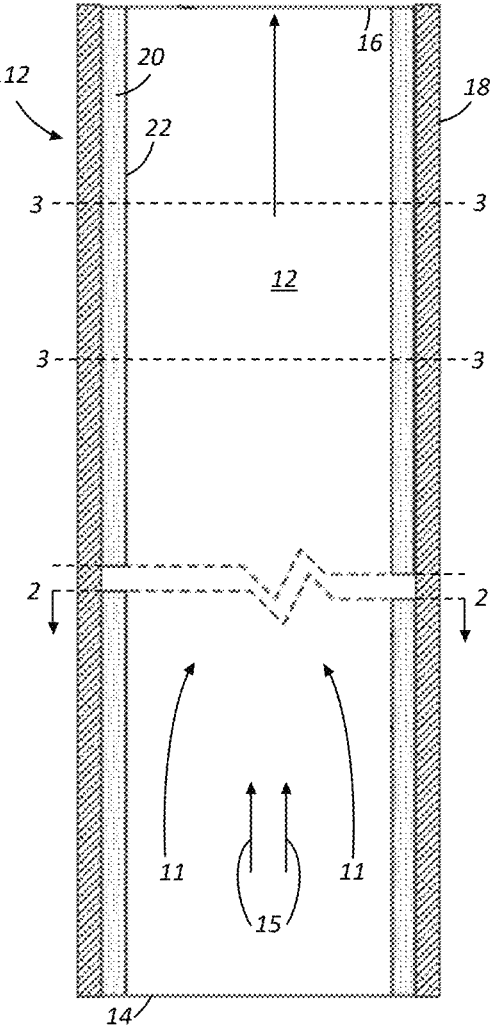
FIG. 2 is a cross section schematic diagram of an exemplary riser reactor in accordance with the present disclosure.

FIG. 2 schematically illustrates a vertical cross section of the exemplary riser reactor 112 shown in FIG. 1 of the present disclosure. The riser reactor 112 has been illustrated schematically for purposes of clarity and brevity, with elements not important to consideration of the present disclosure not included. The riser reactor 112 may be, for example, a catalytic cracking reactor used to convert relatively long chain hydrocarbons to shorter chain products. The riser reactor 112 is generally cylindrically shaped and can be referred to as a pipe reactor. It rises vertically, with feedstock (flow indicated generally at arrow 11) and catalyst (indicated generally at arrow 15) fed to a reactor interior 12 at a lower entrance 14. The catalyst and feedstock contact with one another and the feedstock reacts as they flow vertically through the riser reactor 112 and a product(s) is removed at an upper exit 16. The feedstock may be fluidized in the flowing catalyst.

The riser reactor 112 includes a generally cylindrical side wall 18 that circumferentially surrounds the interior 12 and extends from the entrance 14 to exit 16, with a refractory lining 20 on the interior of the wall 18. The wall is made of metal such as steel. However, the refractory lining can be on both surfaces, the interior and the exterior surface of the riser reactor 112 particularly when the riser is within another vessel. The lining 20 provides thermal and abrasion resistance and may extend over all or a portion of the operational length of the riser reactor 112 between the entrance 14 and exit 16. The riser reactor 112 may operate at high or even extremely high temperatures and further includes flowing reactive catalyst. These and other factors can lead to a highly corrosive environment. Also, minimizing heat losses, minimizing wall 18 temperatures, and maintaining desired temperature in the reactor interior 12 can be important for operational reasons. The refractory lining 20 is useful to address these and other considerations.

In an aspect, the entire refractory lining 20 is, or at least significant portions of it are, continuous. As used herein, the term continuous is intended to broadly refer to a condition of being substantially free from seams or other breakages in construction.

The refractory lining 20 has an interior surface 22 that is generally parallel with the wall 18. The refractory lining thickness between interior surface 22 and the wall 18 may vary with application and other factors, but in many applications will be between about 1.905 cm (¾ inches) and about 20.32 cm (8 inches) thick. In some catalytic cracking reactors, thickness of from about 7.6 cm (3 inches) to about 12.7 cm (5 inches) thick may be useful.

Figure 3:
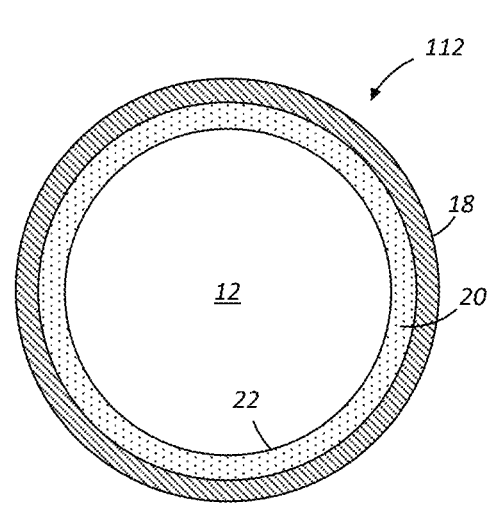
FIG. 3 is a cross section schematic diagram of the exemplary riser reactor of FIG. 1 viewed from the perspective of line 2-2 of FIG. 2 in the direction shown.

FIG. 3 is an overhead plan sectional view of the same riser reactor 112 of FIG. 2 viewed from the perspective of line 2-2 in the direction indicated by the arrows.

Figure 4:
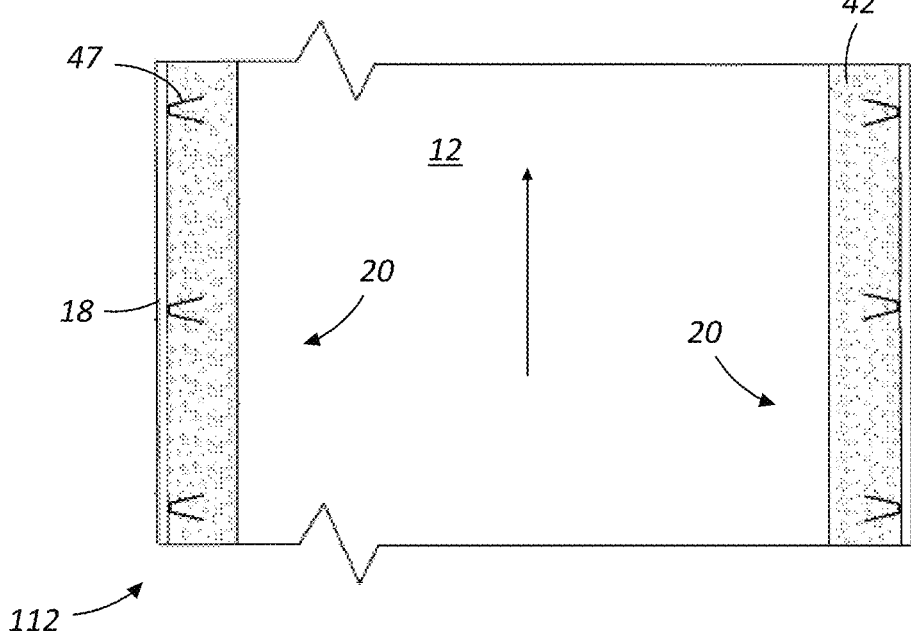
FIG. 4 is a cross section schematic diagram showing a portion of an exemplary riser reactor of the present disclosure.

FIG. 4 shows a more detailed cross section of the portion of the riser reactor 112 identified between dashed lines 3-3 in FIG. 2 (with flow in the general direction of the arrow). The riser reactor 112 includes a plurality of V shaped anchors 47 with a refractory material 42 cast on the wall and supported on the wall 18 with the anchors 47.

The V shaped anchors 47 may be welded onto the wall 18 to enhance adhesion to the wall and mechanical integrity of the refractory lining 20. The V shaped anchors 47 may be made of metal or other material, with one example being 310 stainless steel. The V shaped anchors 47 can be welded to the wall 18, and as indicated are completely enveloped by the refractory material 42. The V shape being wider farther away from the wall 18 functions to adhere the refractory lining 20 to the wall. It will be appreciated that a wide variety of anchors 47 configurations can be used.

Suitable materials for use as the refractory material 42 are those that provide good thermal insulation and/or abrasion resistance. Many are castable. A wide variety of suitable materials are known, including standard Portland Cement as well as numerous more highly engineered materials. Many (but not all) refractory materials are inorganic, nonmetallic, porous and heterogeneous materials comprising thermally stable mineral aggregates, a binder phase and one or more additives. They may comprise one or more of silica, alumina, calcium oxide, titanium oxide, iron oxide, magnesium oxide, zirconium and others. Different compositions can be selected for different applications, with design considerations including degrees of thermal and/or abrasion resistance needed. Examples include higher abrasion resistant refractory materials in sections of the lining that may be subject to significant abrasion.

Example lightweight commercial refractory products include, but are not limited to those having iron oxide content less than about 3.5% (by weight) and aluminum oxides are greater than about 33% (by weight); service temperature ratings of at least 1315° C. (2400° F.); density after heating to 815° C. (1500° F.) and cooling to ambient is between about 1120 kg/m$^3$ (70 lb/ft$^3$) to about 1440 kg/m$^3$ (90 lb/ft$^3$) (as measured using ASTM C 134 testing procedure); cold crushing strength after heating to 815° C. (1500° F.) and cooling to ambient of at least 42 kg/m$^2$ (600 psi) (as measured using ASTM C 133 testing procedure); and thermal conductivity at a mean temperature of 540° C. (1000° F.) between about 0.35 W/m° C. (2.30 BTU-in/ft$^2$-h-° F.) to about 0.45 W/m° C. (3.00 BTU-in/ft$^2$-h-° F.).

Example midweight commercial refractory products include, but are not limited to those having iron oxide content less than 1.0% (by weight) and aluminum oxides greater than 35% (by weight); service temperature ratings of at least 1315° C. (2400° F.); density after heating to 815° C. (1500° F.) and cooling to ambient is between 1600 kg/m$^3$ (100 lb/ft$^3$) and about 2320 kg/m$^3$ (145 lb/ft$^3$) (as measured using ASTM C 134 testing procedure); cold crushing strength after heating to 815° C. (1500° F.) and cooling to ambient of at least about 420 kg/m$^2$ (6000 psi) (as measured using ASTM C 133 testing procedure); and thermal conductivity at a mean temperature of 540° C. (1000° F.) between about 0.75 W/m° C. (5.3 BTU-in/ft$^2$-h-° F.) and about 1.45 W/m° C. (10.0 BTU-in/ft$^2$-h-° F.).

Example high abrasion resistance products with higher abrasion resistance may include (but are not limited to) those having iron oxide content less than 1.0% (by weight) and aluminum oxides are greater than 80% (by weight); service temperature ratings of at least 1260° C. (2300° F.); density after heating to 815° C. (1500° F.) and cooling to ambient of at least 2480 kg/m$^3$ (155 lb/ft$^3$) (as measured using ASTM C 134 testing procedure); cold crushing strength after heating to 815° C. (1500° F.) and cooling to ambient of at least 845 kg/m$^2$ (12,000 psi) (as measured using ASTM C 133 testing procedure).

In an aspect, melt-spun metallic fibers are used with the refractory material. In particular, melt-spun metallic fibers which are produced using the melt extract (ME) process or the melt overflow (MO) process are used. In the ME process, a rotating, water-cooled copper drum with a structured surface is immersed in molten metal for example stainless steel, the copper drum throwing the molten material centrifugally out of the crucible. In the process, the molten material, which is in the form of fibers, solidifies and is collected. Fibers obtained using the ME process may have a diameter of, for example, 500 μm at a length of around 20 mm.

In the MO process, the rotating, water-cooled copper drum is arranged beneath an opening in the crucible containing the molten material, and the molten material is poured slowly onto the rotating drum. MO fibers can be made much thinner than ME fibers, and fibers obtained using the MO process are long fibers which can be used, for example, for fabrics. The MO fibers are sickle-shaped in cross section.

To produce the refractory lining, the reinforcement metallic fibers are firstly gradually admixed to the refractory material in a mixer, until the desired amount of reinforcement metallic fibers has been added. Then, mixing continues until the mixture is homogeneous, after which the dry carbon carrier, such as graphite or soot, is added. Then, a coarser fraction of the refractory material may be gradually admixed to this preliminary mixture, until the entire mass of the refractory material has been homogeneously mixed with the reinforcement metallic fibers and the graphite. If resin-bonded shaped bodies/panels are to be produced, the resin is then added to the cold mixer and mixed until the mixture is homogeneous. If a resin/hardener mixture is being used, the resin is premixed with the hardener, and the two components are added together, or alternatively first only the resin is added, followed by the hardener, mixing in each case taking place until the mixture is homogeneous. Moreover, it is possible for the mixture of the refractory material, the reinforcement metallic fibers and the carbon to be placed in a separate, dedicated mixer in order to be mixed with the resin or binder, where the mixing with the resin takes place. In addition, if desired, the batch contains antioxidants as well as further usual constituents, such as pressing aids, if required.

The finished batch mixture may be fed to the pressers which are customary in the refractory industry where it is pressed into shaped bodies, for example using a pressure of 180 N/mm².

The finished resin-bonded shaped bodies/panels are then subjected to the hardening step which is customary in this technique, at temperatures of between 120° C. and 200° C.

The shaped bodies/panels produced in the ways described above are then fitted at the appropriate locations in the vessel.

In accordance with another aspect of the present disclosure, an apparatus for converting hydrocarbons is disclosed. The apparatus comprises a vessel having a refractory lining of the present disclosure comprising the refractory material and the reinforcement metallic fibers comprising 20 wt % to about 35 wt % chromium, and no less than about 50 wt % iron. In another aspect, the reinforcement metallic fibers may comprise about 0.5 wt % to about 8 wt % aluminum, 10 wt % to about 35 wt % chromium, and no less than about 50 wt % iron. In a further aspect, the reinforcement metallic fibers may comprise at least 2 wt % aluminum and less than 18 wt % chromium.

EXAMPLES

A testing setup was used that allowed rapid screening of several samples in parallel. This test setup included several quartz reactors with a frit on which the sample was placed connected to a common inlet gas manifold to simulate same reaction conditions in parallel across all samples. After the samples were placed inside the reactor(s), under inert gas flow, temperature was raised to 630° C. and at the target temperature, the feed was switched to the gas mixture of 1:1:1 hydrogen: propane: propylene (molar ratio), temperature 630° C., MAPD (methyl acetylene, acetylene and propadiene) levels total ~470 ppm. No S was used in the testing. At the end of the test period, the samples were cooled under inert gas flow to room temperature following which, samples were removed and further analysis conducted. Sample weights were carefully noted before and after each test, and the difference in weight noted as coke deposition during the test. Observations and test results are discussed below.

Example 1

Commercial standard SS-304 metallic fibers were tested along with the metallic fibers of the present disclosure. The composition of the tested fibers is as shown below in Table 2:

TABLE 2

| Fiber Type | Composition (wt %) | | | | | | | | | |
| | C | Si | Mn | P | S | Cr | Ni | Al | Ti | Fe |
|---|---|---|---|---|---|---|---|---|---|---|
| SS-304 | 0.5 | 3.5 | 2 | 0.05 | 0.03 | 18-20 | 8-10.5 | — | — | Balance |
| A | 0.1 | 1 | 1 | 0.04 | 0.01 | 13-15 | ~0.5 | 4-6 | — | Balance |
| B | 0.1 | 1 | 1 | 0.04 | 0.01 | 23-26 | ~0.5 | 4.5-6.5 | — | Balance |
| C | 0.025 | 0.3 | 0.35 | N/A | N/A | 13 | 0 | 3-4 | 0.4 | Balance |

The commercial standard stainless steel 304 (SS-304) fiber was used for comparative analysis as the baseline. A, B and C comprise aluminum containing fibers of the present disclosure.

The bare fibers were tested for weight gain which represents coke deposits. The bare fibers were exposed to the process conditions below:

Feed (molar ratio)=1:1:1 ($H_2$:C3:C3=), no sulfur, and 470 ppm methylacetylene-acetylene-propadiene (MAPD); temperature of 630° C., and time was 8 days.

The results are shown in Table 3 below:

TABLE 3

| Fiber Type | Fresh fibers (weight) (g) | Tested fibers (weight) (g) | Weight gain (mg) | Weight gain per fiber (mg/fiber) |
|---|---|---|---|---|
| SS-304 | 0.3710 | 0.4808 | 109.85 | 18.3 |
| A | 0.3324 | 0.3433 | 10.9 | 1.2 |
| B | 0.3176 | 0.3436 | 26.0 | 2.9 |
| C | 0.3604 | 0.3664 | 6.1 | 1.0 |

SS-304 results represent an average of two commercially available stainless steel 304 (SS-304) fibers. Visually, much higher coke deposits after testing are observed on SS-304 fibers compared to the aluminum containing fibers of the present disclosure. The qualitative visual observations were corroborated by the quantitative results shown in Table 3, with the weight gain for the aluminum containing fibers of the present disclosure significantly lower than commercially available stainless-steel SS-304 fibers when the bare fibers were exposed to the process conditions. This highlights the low coking potential of the bare aluminum containing fibers when compared to the standard SS-304 fibers for hydrocarbon processing.

Example 2

The aluminum containing fibers of the present disclosure were cast into sample blocks with Thermbond 2125 refractory to test expected performance under the above process conditions versus the commercial standard SS-304 fiber embedded refractory samples. The formed green casted blocks were broken into smaller pieces by chipping and the pieces were selected for testing with at least one exposed fiber on the surface. The process conditions were similar as used in Example 1 above. The results are shown in Table 4 below:

TABLE 4

| Refractory name | Fiber name | Temperature (° C.) | Duration (days) | Weight gain (mg/cm2) |
|---|---|---|---|---|
| Thermbond 2125 | SS-304 | 630 | 8 | 10.12 |
| | A | 630 | 8 | 1.44 |
| | B | 630 | 8 | 0.81 |
| | C | 630 | 8 | 1.06 |

As shown in Table 4, for the refractory with aluminum containing fibers of the present disclosure, the weight gain was significantly minimal as compared to the refractory with the commercial standard SS-304 fibers which was an average value.

Figure 5:
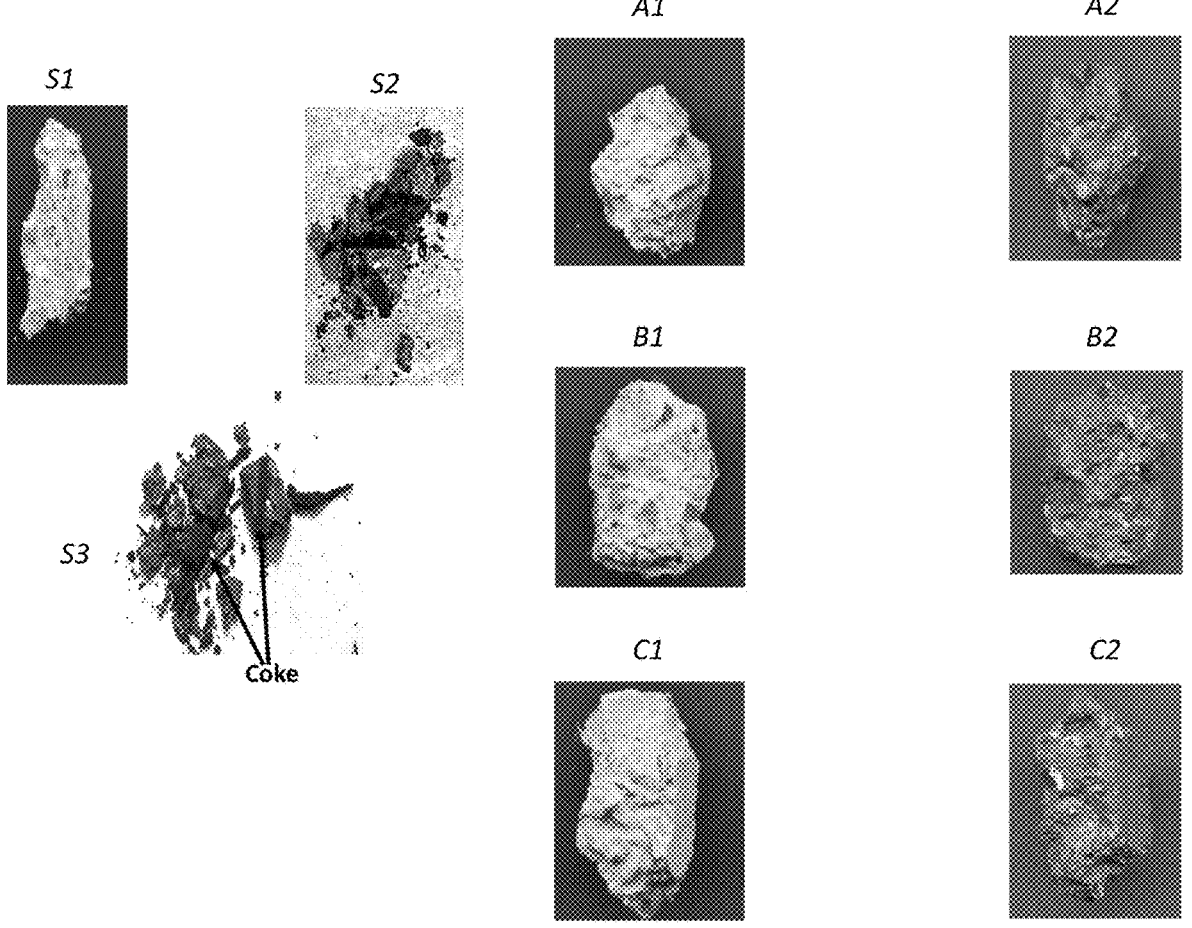
FIG. 5 shows the test results for various refractory lining in accordance with an exemplary embodiment of the present disclosure.

On exposure to the process conditions for 8 days, the SS-304 containing refractory broke apart as a result of the coke deposition on the fibers as shown in FIG. 5. S1 shows the SS-304 fiber embedded Thermbond 2125 refractory before testing and S2 shows the SS-304 fiber embedded Thermbond 2125 refractory after testing. In FIG. 5, S3 shows the higher coke deposition on the SS-304 fiber embedded Thermbond 2125 refractory that broke apart. However, for the refractory with aluminum containing fibers of the present disclosure, the integrity of the sample was maintained.

A comparison of the pictures of the chipped refractory blocks before and after testing is shown in FIG. 5. A1 shows the fiber A embedded Thermbond 2125 refractory before testing and A2 shows the fiber A embedded Thermbond 2125 refractory after testing, B1 shows the fiber B embedded Thermbond 2125 refractory before testing and B2 shows the fiber B embedded Thermbond 2125 refractory after testing, and C1 shows the fiber C embedded Thermbond 2125 refractory before testing and C2 shows the fiber C embedded Thermbond 2125 refractory after testing. As shown in FIG. 5, the fiber A, B, and C embedded Thermbond 2125 refractory maintained the integrity after the testing under the process conditions. These results confirm minimal coke formation under the process conditions occurs on the chipped refractory pieces reinforced with the aluminum containing fibers of the present disclosure and the pieces even with exposed fibers maintain their integrity after 8 days of continued testing as compared to the standard SS-304 fibers. Thus, the incorporation of the aluminum containing fibers enhance the resistance to MCC of the entire refractory lining and help maintain the integrity of the refractory under severe process conditions, thus extending the operating life of the unit.

Example 3

The aluminum containing fibers of the present disclosure were oxidized under air flow at 750° C. for 8 hours. Both, the oxidized and non-oxidized bare fibers were tested under the similar process conditions as in Examples 1 and 2. The results are shown in Table 5 below:

TABLE 5

| Fiber Type | Fresh fibers (weight) (g) | Tested fibers (weight) (g) | Weight gain (mg) | Weight gain per Fiber (mg/fiber) | % coke with SS-304 fiber as baseline |
|---|---|---|---|---|---|
| A | 0.2614 | 0.2766 | 15.2 | 2.2 | 14.01 |
| A (Oxidized) | 0.2941 | 0.3048 | 10.6 | 1.3 | 8.28 |
| B | 0.2824 | 0.3074 | 25 | 3.1 | 19.75 |
| B (Oxidized) | 0.2757 | 0.2843 | 8.6 | 1.1 | 7.00 |
| C | 0.2912 | 0.2954 | 4.3 | 0.9 | 5.73 |
| C (Oxidized) | 0.3695 | 0.3745 | 5 | 0.8 | 5.1 |
| SS-304 | 0.3527 | 0.4467 | 94 | 15.7 | 100 |

The results show that the aluminum containing fibers of the present disclosure performed significantly better in coking mitigation than the commercially available standard SS-304 fibers. In addition, the oxidized aluminum containing fibers of the present disclosure showed significant improvement in coking mitigation over non-oxidized fibers, further improving the resistance to MCC formation.

SPECIFIC EMBODIMENTS

While the following is described in conjunction with specific embodiments, it will be understood that this description is intended to illustrate and not limit the scope of the preceding description and the appended claims.

A first embodiment of the present disclosure is a hydrocarbon conversion process comprising; introducing a feed stream comprising hydrocarbons into a vessel having a refractory lining, the refractory lining comprises a refractory material; and reinforcement metallic fibers comprising about 0.5 wt % to about 8 wt % aluminum, 10 wt % to about 35 wt % chromium, and more than about 50 wt % iron; and converting the hydrocarbons in the vessel at conversion conditions with or without a catalyst to yield a product stream. An embodiment of the present disclosure is one, any or all of prior embodiments in this paragraph up through the first embodiment in this paragraph wherein the reinforcement metallic fibers comprise less than 1 wt % nickel. An embodiment of the present disclosure is one, any or all of prior embodiments in this paragraph up through the first embodiment in this paragraph wherein the reinforcement metallic fibers comprise at least 2 wt % aluminum. An embodiment of the present disclosure is one, any or all of prior embodiments in this paragraph up through the first embodiment in this paragraph wherein the refractory lining comprises about 1 wt % to about 10 wt % reinforcement metallic fibers. An embodiment of the present disclosure is one, any or all of prior embodiments in this paragraph up through the first embodiment in this paragraph wherein the product stream comprises olefins. An embodiment of the present disclosure is one, any or all of prior embodiments in this paragraph up through the first embodiment in this paragraph wherein the reinforcement metallic fibers are oxidized metallic fibers. An embodiment of the present disclosure is one, any or all of prior embodiments in this paragraph up through the first embodiment in this paragraph wherein the reinforcement metallic fibers comprise about less than 1 wt % each of one or more of carbon, silicon, manganese, sulfur, and phosphorus. An embodiment of the present disclosure is one, any or all of prior embodiments in this paragraph up through the first embodiment in this paragraph wherein the refractory lining is supported by anchors which are attached to an inner wall of the vessel. An embodiment of the present disclosure is one, any or all of prior embodiments in this paragraph up through the first embodiment in this paragraph wherein the catalyst is a fluidized catalyst. An embodiment of the present disclosure is one, any or all of prior embodiments in this paragraph up through the first embodiment in this paragraph wherein the reinforcement metallic fibers comprises less than about 20 wt % molybdenum, less than about 5 wt % of about one or more of cobalt, yttrium, niobium, and copper of in total, less than about 1 wt % of titanium, and less than about 1 wt % of lanthanides.

A second embodiment of the present disclosure is a composite comprising a refractory material comprising no more than about 3.5 wt % iron oxide and at least about 33 wt % aluminum oxides; and reinforcement metallic fibers comprising about 0.1 to about 35 wt % chromium and more than about 50 wt % iron. An embodiment of the present disclosure is one, any or all of prior embodiments in this paragraph up through the first embodiment in this paragraph having a refractory density of about 1120 to about 2320 kg/m$^3$. An embodiment of the present disclosure is one, any or all of prior embodiments in this paragraph up through the first embodiment in this paragraph having a refractory cold crushing strength of at least 42 kg/m$^2$. An embodiment of the present disclosure is one, any or all of prior embodiments in this paragraph up through the first embodiment in this paragraph wherein the reinforcement metallic fibers comprise at least 2 wt % aluminum and less than 18 wt % chromium. An embodiment of the present disclosure is one, any or all of prior embodiments in this paragraph up through the first embodiment in this paragraph wherein the reinforcement metallic fibers comprise less than 1 wt % nickel. An embodiment of the present disclosure is one, any or all of prior embodiments in this paragraph up through the first embodiment in this paragraph wherein the refractory lining comprises about 1 wt % to about 10 wt % reinforcement metallic fibers. An embodiment of the present disclosure is one, any or all of prior embodiments in this paragraph up through the first embodiment in this paragraph wherein the reinforcement metallic fibers are oxidized metallic fibers. An embodiment of the present disclosure is one, any or all of prior embodiments in this paragraph up through the first embodiment in this paragraph wherein the reinforcement metallic fibers comprise about 0.5 wt % to about 8 wt % aluminum.

A third embodiment of the present disclosure is an apparatus for converting hydrocarbons, comprising a vessel having a refractory lining, the refractory lining comprises a refractory material; and reinforcement metallic fibers comprising about 0.5 wt % to about 8 wt % aluminum, 10 wt % to about 35 wt % chromium, and more than about 50 wt % iron. An embodiment of the present disclosure is one, any or all of prior embodiments in this paragraph up through the third embodiment in this paragraph wherein the refractory lining is supported by a plurality of anchors which are attached to an inner wall of the vessel. An embodiment of the present disclosure is one, any or all of prior embodiments in this paragraph up through the third embodiment in this paragraph wherein the reinforcement metallic fibers comprise at least 2 wt % aluminum. An embodiment of the present disclosure is one, any or all of prior embodiments in this paragraph up through the third embodiment in this paragraph wherein the refractory lining comprises about 1 wt % to about 10 wt % reinforcement metallic fibers. An embodiment of the present disclosure is one, any or all of prior embodiments in this paragraph up through the third embodiment in this paragraph wherein the reinforcement metallic fibers are oxidized metallic fibers.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A hydrocarbon conversion process, comprising;
   introducing a feed stream comprising hydrocarbons into a vessel having a refractory lining, the refractory lining comprises:
   a refractory material; and
   reinforcement metallic fibers comprising about 0.5 wt % to about 8 wt % aluminum, about 10 wt % to about 35 wt % chromium, and no less than about 50 wt % iron; and
   processing the hydrocarbons in the vessel at conditions present in the vessel,
   wherein the refractory lining comprises about 1 wt % to about 10 wt % reinforcement metallic fibers.

2. The process of claim 1, wherein the reinforcement metallic fibers comprise less than 1 wt % nickel.

3. The process of claim 1, wherein the reinforcement metallic fibers comprise at least 2 wt % aluminum no more than about 18 wt % chromium.

4. The process of claim 1 further comprising producing a product stream from said vessel, wherein the product stream comprises olefins.

5. The process of claim 1, wherein the reinforcement metallic fibers are oxidized metallic fibers.

6. The process of claim 1 further comprising a catalyst in said vessel and fluidizing said catalyst.

7. The process of claim 1, wherein the reinforcement metallic fibers comprise less than about 20 wt % molybdenum, less than about 5 wt % of one or more of cobalt, yttrium, niobium, and copper, less than about 1 wt % titanium, and less than about 1 wt % lanthanides.

8. A composite comprising:
   a refractory material comprising no more than about 3.5 wt % iron oxide and at least about 33 wt % aluminum oxides; and
   reinforcement metallic fibers comprising about 0.5 to about 8 wt % aluminum, 10 to about 35 wt % chromium and no less than about 50 wt % iron,
   wherein the refractory lining comprises about 1 wt % to about 10 wt % reinforcement metallic fibers.

9. The composite of claim 8 wherein the reinforcement metallic fibers comprise no more than about 18 wt % chromium.

10. The composite of claim 8 having a refractory density of about 1120 to about 2320 kg/m$^3$.

11. The composite of claim 8 having a refractory cold crushing strength of at least 42 kg/m².

12. The composite of claim 9, wherein the reinforcement metallic fibers comprise at least 2 wt % aluminum.

13. The composite of claim 8, wherein the reinforcement metallic fibers comprise less than 1 wt % nickel.

14. The composite of claim 8, wherein the reinforcement metallic fibers are oxidized metallic fibers.

15. An apparatus for processing hydrocarbons, comprising:

a vessel having a refractory lining, the refractory lining comprises:

a refractory material; and reinforcement metallic fibers comprising about 0.5 wt % to about 8 wt % aluminum, 10 wt % to about 35 wt % chromium, and more than about 50 wt % iron, wherein the refractory lining comprises about 1 wt % to about 10 wt % reinforcement metallic fibers.

16. The apparatus of claim 15, wherein the reinforcement metallic fibers are oxidized metallic fibers.

17. The apparatus of claim 15, wherein the reinforcement metallic fibers comprise less than 1 wt % nickel.

\* \* \* \* \*